(12) United States Patent
Shoji

(10) Patent No.: US 11,044,436 B2
(45) Date of Patent: Jun. 22, 2021

(54) INFORMATION PROCESSING APPARATUS

(71) Applicant: CANON KABUSHIKI KAISHA, Tokyo (JP)

(72) Inventor: Ryota Shoji, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/847,110

(22) Filed: Apr. 13, 2020

(65) Prior Publication Data

US 2020/0336697 A1 Oct. 22, 2020

(30) Foreign Application Priority Data

Apr. 17, 2019 (JP) .............................. JP2019-078658

(51) Int. Cl.
*H04N 5/91* (2006.01)
*G11B 27/031* (2006.01)
*H04N 5/76* (2006.01)

(52) U.S. Cl.
CPC ............. *H04N 5/91* (2013.01); *G11B 27/031* (2013.01)

(58) Field of Classification Search
USPC .................. 386/239–248, 300–313, 278–290
See application file for complete search history.

(56) References Cited

U.S. PATENT DOCUMENTS

| 8,355,070 | B2 * | 1/2013 | Shiohara | H04N 1/00161 348/333.12 |
| 2005/0174449 | A1 * | 8/2005 | Matsuzaka | H04N 1/56 348/240.3 |
| 2005/0175260 | A1 * | 8/2005 | Takahashi | G06T 11/60 382/309 |
| 2005/0275732 | A1 * | 12/2005 | Takeuchi | H04N 1/0044 348/231.99 |
| 2008/0079823 | A1 * | 4/2008 | Kojima | H04N 5/772 348/231.99 |
| 2009/0304300 | A1 * | 12/2009 | Minobe | H04N 5/21 382/254 |
| 2010/0277508 | A1 * | 11/2010 | Takahashi | H04N 1/00238 345/660 |

FOREIGN PATENT DOCUMENTS

JP 2011-010090 A 1/2011

* cited by examiner

*Primary Examiner* — Hung Q Dang
(74) *Attorney, Agent, or Firm* — Cowan, Liebowitz & Latman, P.C.

(57) ABSTRACT

An information processing apparatus includes: a setting unit configured to set a parameter; an export unit configured to perform export processing of a RAW moving image using the set parameter; a first selecting unit configured to select at least one of RAW moving images on which export processing is performed, in accordance with a user operation; and a second selecting unit configured to automatically select, from RAW moving images not selected by the first selecting unit, a RAW moving image whose a parameter used for export processing matches that of a RAW moving image selected by the first selecting unit, wherein the export unit collectively performs re-export processing which uses a parameter different from the parameter used for the export processing, on the RAW moving image selected by the first selecting unit and the RAW moving image selected by the second selecting unit.

12 Claims, 14 Drawing Sheets

| | CLIP NAME | PROGRESS | SAVE FOLDER | OUTPUT FORMAT | RESOLUTION | DEVELOPMENT SETTINGS |
|---|---|---|---|---|---|---|
| 1 | AAAA | 5 % | C:\User\export | DPX 10bit | 4096 x 2160 | 1.0/5500/5/BT.2020/BT.2020/OFF |
| 2 | BBBB | 0 % | C:\User\export | DPX 10bit | 2048 x 1080 | 1.0/3300/0/BT.2020/BT.2020/OFF |
| 3 | CCCC | 0 % | C:\User\export | MOV 8bit | 1920 x 1080 | 1.0/5500/0/BT.709/BT.709/ON |

301

NUMBER OF REMAINING CLIPS: 3    REMAINING TIME: 00:00:05:20

| CLIP NAME | SAVE FOLDER | OUTPUT FORMAT | RESOLUTION | DEVELOPMENT SETTINGS |
|---|---|---|---|---|
| EEEE | C:\User\export | DPX 10bit | 4096 x 2160 | 0.5/6000/2/BT.2020/BT.2020/OFF |
| FFFF | C:\User\export | DPX 10bit | 4096 x 2160 | 0.5/6000/2/BT.2020/BT.2020/OFF |
| GGGG | C:\User\export | DPX 10bit | 4096 x 2160 | 0.5/6000/2/BT.2020/BT.2020/ON |
| ... | | | ... | |
| JJJJ | C:\User\export | DPX 10bit | 2048 x 1080 | 1.0/5500/0/BT.2020/BT.2020/OFF |
| KKKK | C:\User\export | DPX 10bit | 4096 x 2160 | 1.2/3500/1/BT.2020/BT.2020/OFF |
| LLLL | C:\User\export | DPX 10bit | 4096 x 2160 | 1.2/3500/1/BT.2020/BT.2020/OFF |
| MMMM | C:\User\export | DPX 10bit | 4096 x 2160 | 1.2/3500/1/BT.2020/BT.2020/OFF |
| NNNN | C:\User\export | DPX 10bit | 4096 x 2160 | 1.2/3500/1/BT.2020/BT.2020/OFF |
| OOOO | C:\User\export | MOV 8bit | 4096 x 2160 | 2.0/5500/1/BT.2020/BT.2020/OFF |
| ... | | | ... | |
| XXXX | C:\User\export | MOV 8bit | 1920 x 1080 | 1.0/5500/0/BT.709/BT.709/ON |
| YYYY | C:\User\export | DPX 10bit | 4096 x 2160 | 1.0/5500/0/BT.709/BT.709/OFF |
| ZZZZ | C:\User\export | DPX 10bit | 4096 x 2160 | 1.0/5500/0/BT.709/BT.709/OFF |

| | CLIP NAME | PROGRESS | SAVE FOLDER | OUTPUT FORMAT | RESOLUTION | DEVELOPMENT SETTINGS |
|---|---|---|---|---|---|---|
| 1 | KKKK | 0 % | C:\User\export | MOV 8bit | 1920 x 1080 | 1.2/3500/1/BT.709/BT.709/ON |
| 2 | LLLL | 0 % | C:\User\export | MOV 8bit | 1920 x 1080 | 1.2/3500/1/BT.709/BT.709/ON |
| 3 | MMMM | 0 % | C:\User\export | MOV 8bit | 1920 x 1080 | 1.2/3500/1/BT.709/BT.709/ON |
| 4 | NNNN | 0 % | C:\User\export | MOV 8bit | 1920 x 1080 | 1.2/3500/1/BT.709/BT.709/ON |

NUMBER OF REMAINING CLIPS: 4    REMAINING TIME: 00:00:20:00

| | CLIP NAME | PROGRESS | SAVE FOLDER | OUTPUT FORMAT | RESOLUTION | DEVELOPMENT SETTINGS |
|---|---|---|---|---|---|---|
| 1 | AABB | 0 % | C:\User\export | MOV 8bit | 1920 x 1080 | 1.2/3500/1/BT.709/BT.709/ON |
| 2 | CCDD | 0 % | C:\User\export | MOV 8bit | 1920 x 1080 | 1.2/3500/1/BT.709/BT.709/ON |
| 3 | EEFF | 0 % | C:\User\export | MOV 8bit | 1920 x 1080 | 1.2/3500/1/BT.709/BT.709/ON |
| 4 | GGHH | 0 % | C:\User\export | DPX 10bit | 3840 x 2160 | 1.2/3500/1/BT.2020/BT.2020/OFF |

NUMBER OF REMAINING CLIPS: 4   REMAINING TIME: 00:00:20:00

DELETE FROM LIST
CHANGE EXPORT SETTINGS

FIG. 8C

| | CLIP NAME | PROGRESS | SAVE FOLDER | OUTPUT FORMAT | RESOLUTION | DEVELOPMENT SETTINGS |
|---|---|---|---|---|---|---|
| 1 | AABB | 0 % | C:\User\export | MOV 8bit | 3840 x 2160 | 1.2/3500/1/BT.709/BT.709/ON |
| 2 | CCDD | 0 % | C:\User\export | MOV 8bit | 3840 x 2160 | 1.2/3500/1/BT.709/BT.709/ON |
| 3 | EEFF | 0 % | C:\User\export | MOV 8bit | 3840 x 2160 | 1.2/3500/1/BT.709/BT.709/ON |
| 4 | GGHH | 0 % | C:\User\export | DPX 10bit | 3840 x 2160 | 1.2/3500/1/BT.2020/BT.2020/OFF |

NUMBER OF REMAINING CLIPS: 4   REMAINING TIME: 00:00:20:00

INFORMATION PROCESSING APPARATUS

BACKGROUND OF THE INVENTION

Field of the Invention

The present invention relates to an information processing apparatus that develops a RAW moving image captured by an imaging device.

Description of the Related Art

In recent years, an imaging device (such as a digital video camera) capable of capturing a RAW moving image (RAW-format moving image) has attracted attention in the field of image production. Information acquired from image sensors of the imaging device is recorded in the RAW moving image as information (an image) of each frame as it is (for example, without performing image processing). Therefore, a RAW moving image has a characteristic that "the image quality can be freely adjusted by performing development (development processing) with an information processing apparatus (such as a personal computer (PC)) after shooting." Through development, a RAW moving image is converted into a moving image of a general file format (file format) such as digital picture exchange (DPX). Processing of converting (developing) the file format of a RAW moving image and storing the converted (developed) moving image is called "export" or the like.

When moving images are handled with a color grading system, generally, a RAW moving image is converted into a moving image of a file format giving priority to the image quality (for example, an uncompressed RGB format) and color grading is performed using the converted moving image. Hereinafter, development with a setting giving priority to the image quality is referred to as "material development" and a moving image obtained through material development is referred to as a "material moving image."

On the other hand, other editing work such as cut editing often does not require high-quality moving images. Therefore, when moving images are handled with such another editing system, generally, a RAW moving image is converted into a moving image having a relatively small data size through processing such as reduction or compression and editing work is performed using the converted moving image. Hereinafter, development with a setting not giving priority to the image quality is referred to as "proxy development" and a moving image obtained through proxy development is referred to as a "proxy moving image."

Through cut editing, the section of a moving image to be finally used is determined using the proxy moving image. Then, the editing system for cut editing outputs an edit decision list (EDL) in which time code information of the determined section is described. Thereafter, the color grading system reads the EDL and the material moving image and performs final color adjustment or the like for the section designated through the EDL using the material moving image. In a workflow for performing cut editing and color grading or the like, two types of moving images, a material moving image and a proxy moving image, are generated and used from a RAW moving image as described above.

Generally, the processing load (processing time) of development is large and it is necessary to determine development parameters for each piece of content or each scene of a moving image. A technique for reducing the processing load and work time of development is disclosed, for example, in Japanese Patent Application Publication No. 2011-10090. An image processing apparatus disclosed in Japanese Patent Application Publication No. 2011-10090 stores a plurality of development results (developed moving images) corresponding to a plurality of development parameters in advance and displays a development result corresponding to development parameters designated by a user when development has been performed with the development parameters designated by the user.

Here, the user may desire to change development parameters for a plurality of RAW moving images that have been developed with specific development parameters to develop the moving images again and save (export) the developed moving images. For example, the user may desire to generate proxy moving images for a plurality of RAW moving images for which material moving images have been generated. In such a case, the user needs to specify a plurality of RAW moving images that have been developed with specific development parameters. However, the user cannot easily specify desired RAW moving images and re-export them efficiently, for example, when there are many developed RAW moving images or when a group of development parameters (a combination of development parameters) used in one development is diversified. Before development, a similar problem also occurs when changing development parameters for a plurality of RAW moving images for which specific development parameters have been set.

SUMMARY OF THE INVENTION

The present invention in its first aspect provides a technique for efficiently performing re-export and parameter change of a plurality of RAW moving images.

An information processing apparatus according to the present invention, includes at least one memory and at least one processor which function as: a setting unit configured to set a parameter for export processing of a RAW moving image; an export unit configured to perform export processing to develop a RAW moving image and save the developed moving image in a predetermined storage area, using the parameter set by the setting unit; a first selecting unit configured to select at least one of a plurality of RAW moving images on which export processing of the export unit is performed, in accordance with a user operation; and a second selecting unit configured to automatically select, from a plurality of RAW moving images not selected by the first selecting unit, a RAW moving image whose a parameter used for export processing matches that of a RAW moving image selected by the first selecting unit, wherein the export unit collectively performs re-export processing which uses a parameter different from the parameter used for the export processing, on the RAW moving image selected by the first selecting unit and the RAW moving image selected by the second selecting unit.

Further features of the present invention will become apparent from the following description of exemplary embodiments with reference to the attached drawings.

BRIEF DESCRIPTION OF THE DRAWINGS

FIGS. 3A and 3B are diagrams showing examples of screens according to the first embodiment;

FIGS. 5A to 5C are diagrams showing examples of screens according to the first embodiment;

FIGS. 8A to 8C are diagrams showing examples of screens according to the second embodiment.

DESCRIPTION OF THE EMBODIMENTS

Hereinafter, embodiments of the present invention will be described. An information processing apparatus according to the following embodiments is an apparatus that exports a moving image and is, for example, a personal computer (PC). In the following embodiments, export refers to processing including development of a RAW moving image (RAW-format moving image), specifically processing of converting (developing) the file format of a RAW moving image and saving the converted (developed) moving image in a predetermined storage area.

First Embodiment

Figure 1:
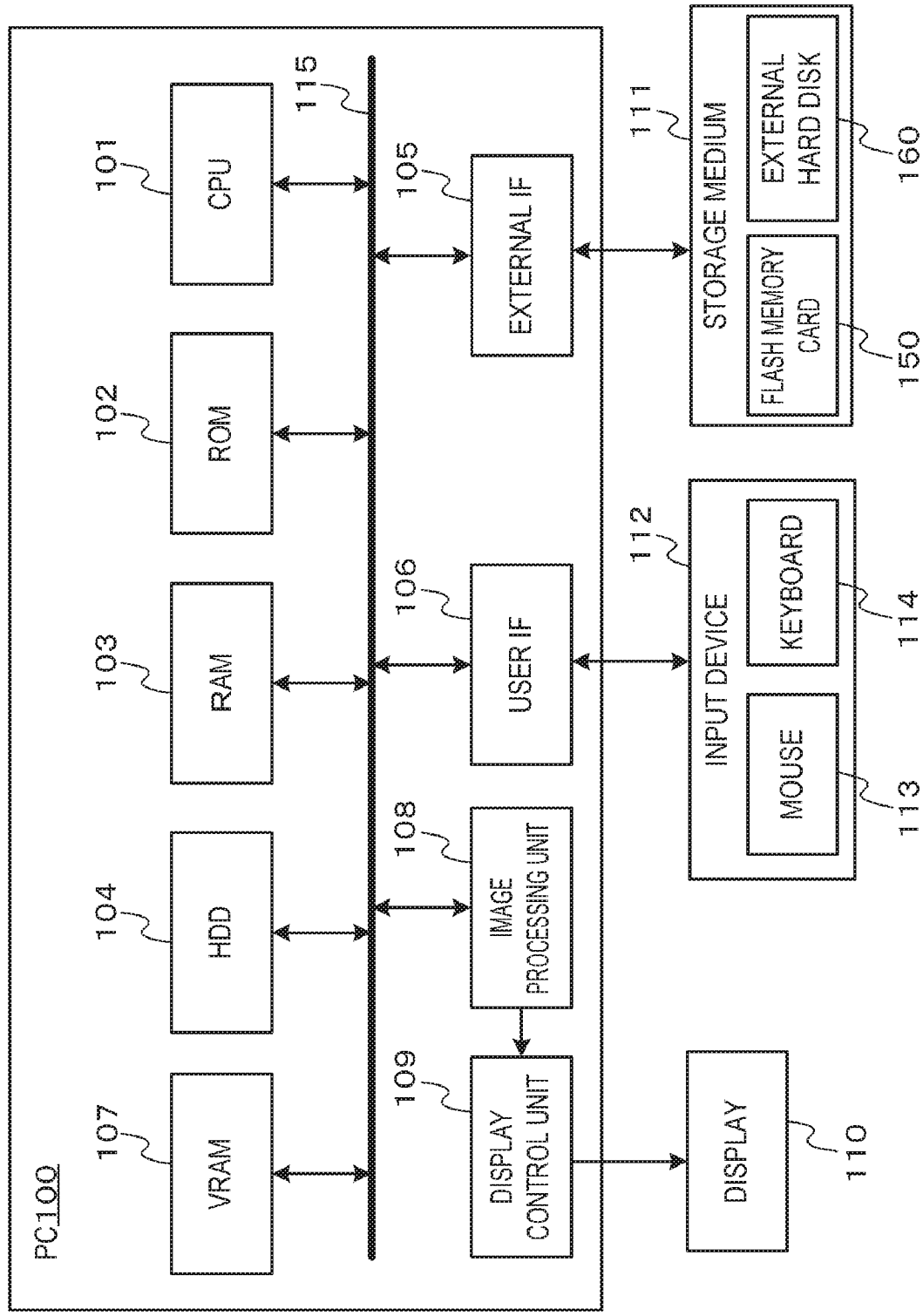
FIG. 1 is a block diagram showing an exemplary configuration of an information processing apparatus according to a first embodiment.

A first embodiment of the present invention will now be described. FIG. 1 is a block diagram showing an exemplary configuration of a PC 100 (information processing apparatus) according to the first embodiment. The PC 100 includes a CPU 101, a ROM 102, a RAM 103, an HDD 104, an external IF 105, a user IF 106, a VRAM 107, an image processing unit 108, a display control unit 109, and an internal bus 115.

The CPU 101 performs overall control of the PC 100. The ROM 102 is a memory for storing a control program describing a processing procedure of the CPU 101. The RAM 103 is used as a work memory for temporarily storing the control program and data. The HDD 104 is a hard disk drive for storing various programs such as applications and an operating system (OS) and various data. The external IF 105 is an interface for connecting the PC 100 to an external storage medium 111 (such as a flash memory card 150 or an external hard disk 160). The user IF 106 receives a user operation performed on the PC 100. Specifically, the user IF 106 performs processing of operation information output from an input device 112 (such as a mouse 113 or a keyboard 114) in accordance with a user operation performed using the input device 112. The PC 100 and the input device 112 may be integrally configured (the input device 112 may be a part of the PC 100). The VRAM 107 is a memory in which the PC 100 stores an image for display on a display 110 (such as a liquid crystal display). The PC 100 and the display 110 may be integrally configured (the display 110 may be a part of the PC 100). The image processing unit 108 performs various image processing such as export. The display control unit 109 displays the image stored in the VRAM 107 on the display 110. The internal bus 115 is a transmission path for various signals (such as control signals) and various data (such as image data). The CPU 101, the ROM 102, the RAM 103, the HDD 104, the external IF 105, the user IF 106, the VRAM 107, the image processing unit 108, and the display control unit 109 are connected to the internal bus 115. Transmission and reception of various signals and various data between these components is performed via the internal bus 115. In the first embodiment, it is assumed that RAW moving images are stored in the HDD 104. RAW moving images may also be stored in the storage medium 111.

An export application according to the first embodiment will now be described with reference to FIGS. 2A, 2B, 3A, and 3B.

Figure 2A:
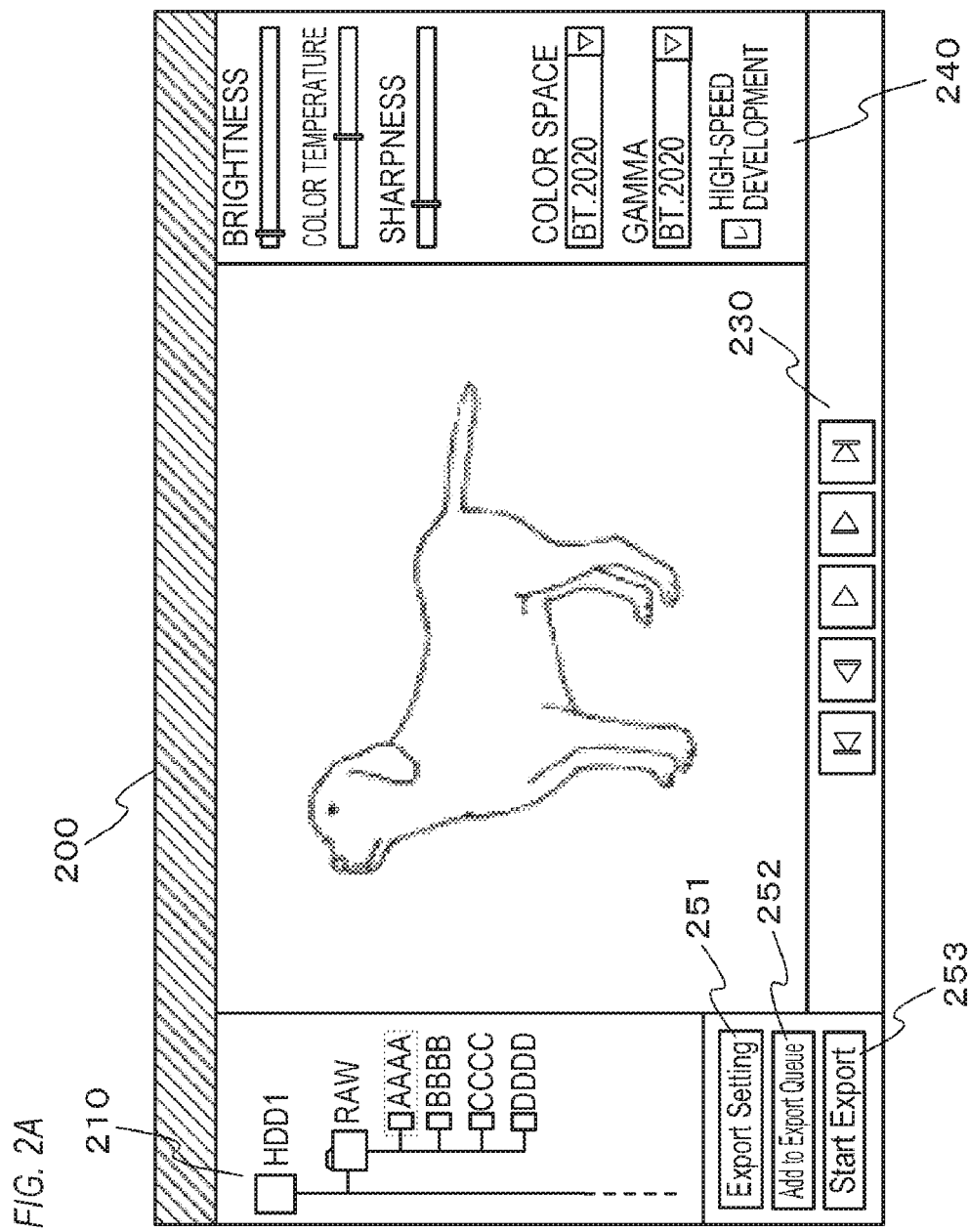
FIGS. 2A and 2B are diagrams showing examples of screens according to the first embodiment.

FIG. 2A shows an example of a basic screen 200 of the export application. The CPU 101 starts the export application and controls the VRAM 107, the display control unit 109, and the like such that the basic screen 200 is displayed on the display 110. A list of RAW moving images stored in the HDD 104 or the like is displayed in a moving image list display area 210 of the basic screen 200. "AAAA," "BBBB," "CCCC," and "DDDD" in the moving image list display area 210 are the names of RAW moving images, A RAW moving image selected (designated) by a user is reproduced and displayed in a preview area 220. A reproduction control portion 230 is a portion that receives a user operation for performing reproduction control (such as normal playback, frame advance, or frame rewind) of the RAW moving image displayed in the preview area 220. A development parameter setting portion 240 is a portion that receives a user operation for setting (designating) development parameters such as those of brightness, color temperature, sharpness, color space, gamma, and high-speed development setting (high-speed development enabling/disabling). An export setting dialog display button 251 is a button for displaying an export setting dialog. The export setting dialog is a dialog for setting (designating) other parameters relating to export. An export queue addition button 252 is a button for adding the selected RAW moving image to an export queue. An export start button 253 is a button for starting export of RAW moving images in the export queue.

Figure 2B:
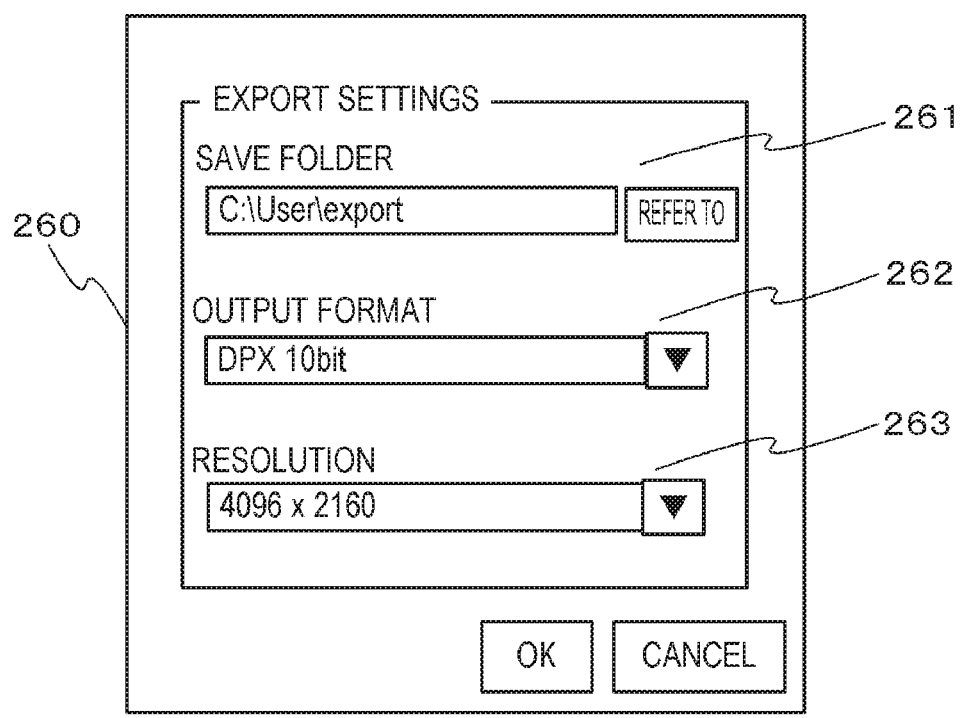

FIG. 2B shows an example of the export setting dialog 260. When the export setting dialog display button 251 in FIG. 2A has been pressed, the CPU 101 controls the VRAM 107, the display control unit 109, and the like such that the export setting dialog 260 is displayed on the display 110. A save folder setting portion 261 is a portion that receives a user operation for setting (designating) a save folder of the moving image (moving image file) to be saved through export. An export file format setting portion 262 is a portion that receives a user operation for setting (designating) a file format of the moving image to be saved through export (the moving image generated through development). Hereinafter, the file format of the moving image to be saved through export (the moving image generated through development) is referred to as an "output format." An output resolution setting portion 263 is a portion that receives a user operation for setting (designating) the resolution of the moving image to be saved through export. Hereinafter, the resolution of the moving image to be saved through export is referred to as an "output resolution."

FIG. 3A shows an example of an export queue window 300 that displays information on RAW moving images in the export queue and the progress of export thereof. For example, when the export queue addition button 252 in FIG. 2A has been pressed, the CPU 101 sets parameters for export for the selected RAW moving image and adds the selected RAW moving image to the export queue. Specifically, the CPU 101 sets a plurality of parameters designated through the development parameter setting portion 240 in FIG. 2A and the save folder setting portion 261, the export file format setting portion 262, and the output resolution setting portion 263 in FIG. 2B. Then, the CPU 101 controls the VRAM 107, the display control unit 109, and the like such that an export queue window 300 is displayed on the display 110. When the export queue window 300 has already been displayed, the CPU 101 adds information of the RAW moving image added to the export queue to the displayed export queue window 300.

A list of RAW moving images (RAW moving images to be exported) in the export queue is displayed in an export content display portion 301. The name of the RAW moving image, the progress of export, and parameters for export (such as a save folder, an output format, an output resolution, and development settings (development parameters)) are displayed for each RAW moving image in the list displayed in the export content display portion 301. In the example of FIG. 3A, RAW moving images AAAA, BBBB, and CCCC are in the export queue. Brightness, color temperature, sharpness, color space, gamma, and high-speed development settings are also displayed as development settings in this order. Each row of the list displayed in the export content display portion 301 is one task. In the example of FIG. 3A, three tasks are in the export queue. The entire progress of export (such as the number of unexecuted tasks and a remaining time until export is completed) is displayed in an export progress display portion 302. When the export start button 253 in FIG. 2A has been pressed, the CPU 101 controls the image processing unit 108 to start export (execution of tasks in the export queue) using the set parameters. Then, the CPU 101 sequentially updates display of the export progress display portion 302 and display of the progress in the export content display portion 301 according to the progress of export.

FIG. 3B shows an example of an export result window 310 that displays export results. For example, when export has been completed, the CPU 101 controls the VRAM 107, the display control unit 109, and the like such that the export result window 310 is displayed on the display 110. A list of exported RAW moving images is displayed in an export result display portion 311. The name of the RAW moving image and parameters for export (such as those of a save folder, an output format, an output resolution, and development settings) are displayed for each RAW moving image in the list displayed in the export result display portion 311. In the example of FIG. 3B, an export execution history shows that RAW moving images EEEE, FFFF, . . . , and ZZZZ have been exported.

Figure 4:
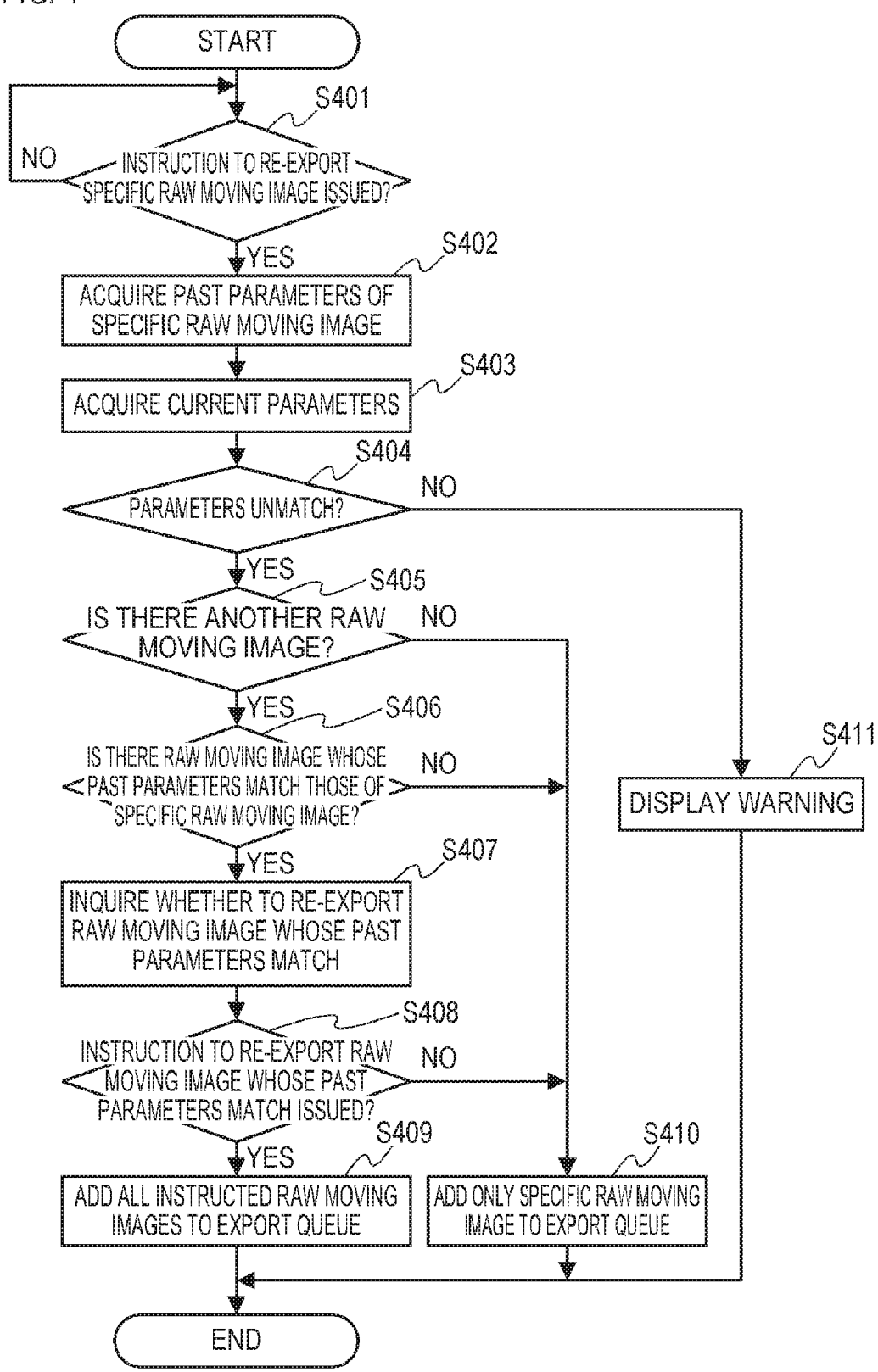
FIG. 4 is a flowchart showing an exemplary operation according to the first embodiment.

The PC 100 can export the exported RAW moving images again. FIG. 4 is a flowchart showing an exemplary operation of the PC 100 (the export application) when re-export is performed. The operation of FIG. 4 starts, for example, in accordance with display of the export result window 310 of FIG. 3B.

In step S401, the CPU 101 determines whether or not the user has issued an instruction to re-export a specific RAW moving image that has been exported. The CPU 101 repeals the processing of step S401 until a re-export instruction (user operation) is issued. When a re-export instruction has been issued, the CPU 101 selects a specific RAW moving image in accordance with the instruction and advances the processing to step S402. The CPU 101 also sets parameters for re-export. Specifically, the CPU 101 sets a plurality of parameters that have been designated through the development parameter setting portion 240 in FIG. 2A and the save folder setting portion 261, the export file format setting portion 262, and the output resolution setting portion 263 in FIG. 2B.

Figure 5A:
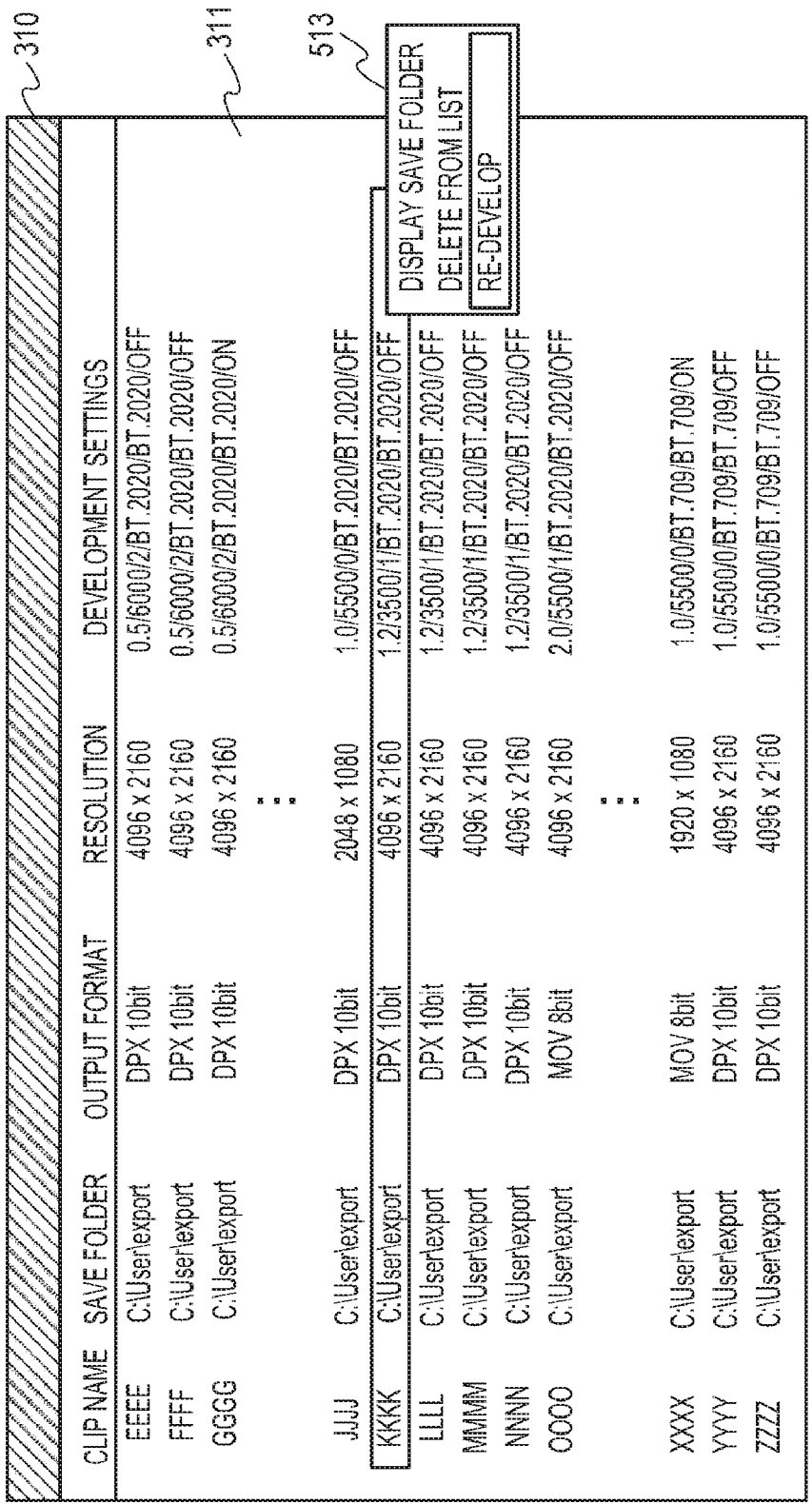

FIG. 5A shows an example of the export result window 310. As shown in FIG. 5A, the CPU 101 displays a context menu 513 in accordance with a user operation of designating a specific RAW moving image from the export result display portion 311 (the list of exported RAW moving images). The context menu 513 is a menu for inquiring of the user whether or not to re-export the specific RAW moving image (the RAW moving image designated by the user). The re-export instruction is a user operation for designating "re-development" in the context menu 513. Here, it is assumed that an instruction to re-export a RAW moving image KKKK has been issued.

In step S402, the CPU 101 acquires parameters used in the past export of the specific RAW moving image (the RAW moving image which has been selected in step S401 and for which a re-export instruction (user operation) has been issued). Specifically, the CPU 101 acquires parameters (a save folder, an output format, an output resolution, and development settings) displayed in association with the RAW moving image KKKK in the export result display portion 311 in FIG. 5A.

In step S403, the CPU 101 acquires current parameters set for re-export, Specifically, the CPU 101 acquires a plurality of parameters that have been designated through the development parameter setting portion 240 in FIG. 2A and the save folder setting portion 261, the export file format setting portion 262, and the output resolution setting portion 263 in FIG. 2B. That is, the CPU 101 acquires the brightness, color temperature, sharpness, color space, gamma, high-speed development setting, save folder, output format, and output resolution that have been designated.

In step S404, the CPU 101 compares the parameters acquired in step S402 with the parameters acquired in step S403 and determines whether or not they differ from each other. Specifically, the CPU 101 determines whether or not a type of which a parameter acquired in step S402 and a parameter acquired in step S403 differ from each other is included in a plurality of types of the plurality of parameters, if such a type is included, the processing proceeds to step S405. If such a type is not included (the plurality of parameters acquired in step S402 completely match the plurality of parameters acquired in step S403), the processing proceeds to step S411.

In step S411, the CPU 101 provides predetermined notification (notification control). Specifically, the CPU 101 displays a message (warning) on the display 110 to notify the user that re-export is going to be performed using the same parameters as those in the past. Then, the CPU 101 ends the operation of FIG. 4 without performing re-export.

In step S405, the CPU 101 determines whether or not a RAW moving image other than the RAW moving image selected in step S401 is present in the export result display portion 311 (the list of exported RAW moving images) in FIG. 5A. The processing proceeds to step S406 if such a RAW moving image is present, and otherwise proceeds to step S410.

In step S406, the CPU 101 acquires parameters used in the past export of all RAW moving images that have been determined to be present in step S405. Then, the CPU 101 determines whether or not there is a RAW moving image which has been determined to be present in step S405 and whose parameter used in the past export matches a parameter acquired in step S402. The processing proceeds to step S407 if there is such a RAW moving image, and otherwise proceeds to step S410.

Note that the RAW moving image detected in step S406 may be or may not be a RAW moving image of which a plurality of parameters used in the past export all match those of the specific RAW moving image (the RAW moving image selected in step S401). The RAW moving image detected in step S406 may be a RAW moving image of which some of a plurality of parameters used in the past export matches that of the specific RAW moving image. The RAW moving image detected in step S406 may be a RAW moving image of which only an output format in the past export matches that of the specific RAW moving image. The RAW moving image detected in step S406 may be a RAW moving image of which only a specific type(s) of parameter (s), which is some or all of a plurality of parameters used in the past export, matches that of the specific RAW moving image.

Figure 6:
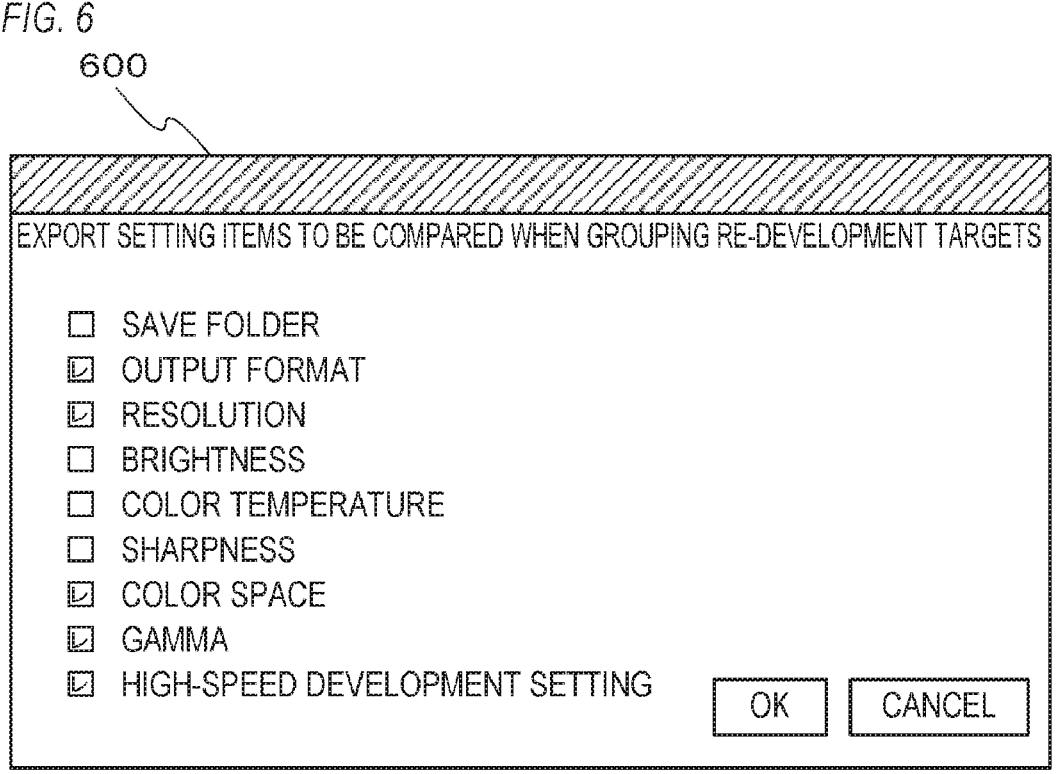
FIG. 6 is a diagram showing an example of a screen according to the first embodiment.

The specific type used for the determination of step S406 is, for example, a type designated by the user. FIG. 6 shows an example of a dialog 600 for determining specific types. The user can designate specific types by performing a user operation of checking checkboxes in a dialog. In the example of FIG. 6, an output format, an output resolution, a color space, a gamma, and a high-speed development setting have been designated as specific types.

The specific types may be determined in advance by a manufacturer of the export application or the like or may be automatically determined (changed) by the CPU 101 (the export application). When a plurality of RAW moving images have been selected in step S401, a parameter commonly used in the past export of the plurality of RAW moving images may be used as a specific type of parameter. For example, only the color space and gamma are used as specific types of parameters if color space and gamma values used in the past export of a plurality of selected RAW moving images match and the other parameters do not match.

Figure 5B:
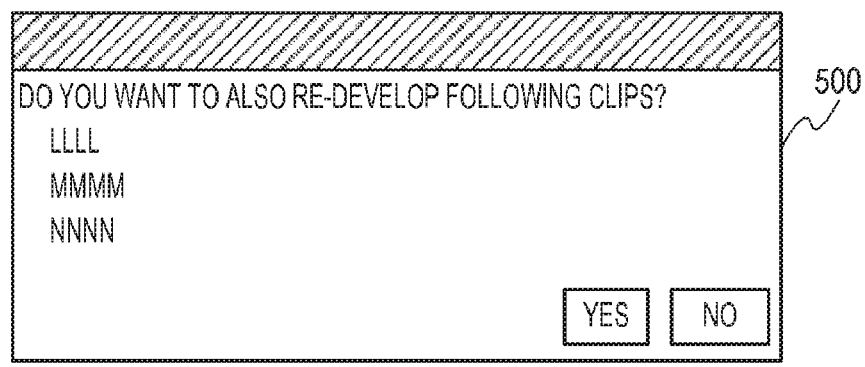

Reference is now made back to FIG. 4. In step S407, the CPU 101 inquires of the user whether or not to also re-export the RAW moving images detected in step S406 (the RAW moving images determined to be present). Specifically, the CPU 101 displays a dialog 500 for inquiring of the user whether or not to re-export the RAW moving images detected in step S406 on the display 110 as shown in FIG. 5B. A list of the RAW moving images detected in step S406 or the like is displayed in the dialog 500. In the example of FIG. 5B, a list of RAW moving images LLLL, MMMM, and NNNN is displayed by the names of the images. Shooting settings, development settings, a thumbnail, and the like of each RAW moving image may be further displayed.

In step S408, the CPU 101 determines whether or not the user has issued a re-export instruction (reply) in response to the inquiry of step S407. The processing proceeds to step S409 when an instruction has been issued (when a "YES" button has been pressed in the dialog 500 of FIG. 5B) and proceeds to step S410 when no instruction has been issued (when a "NO" button has been pressed in the dialog of FIG. 5B).

In step S409, the CPU 101 adds the RAW moving image selected in step S401 and the RAW moving images detected in step S406 to the export queue. Then, the operation of FIG. 4 ends. FIG. 5C shows an example of the export queue window 300 after the processing of step S409. In the example of FIG. 5C the RAW moving images KKKK, LLLL, MMMM, and NNNN are in the export queue. Parameters of the RAW moving images KKKK, LLLL, MMMM, and NNNN in FIG. 5C are the current parameters set for re-export and differ from those of FIG. 5A. The RAW moving image selected in step S401 and the RAW moving images detected in step S406 are exported collectively (sequentially) when the export start button 253 in FIG. 2A has been pressed after the processing of step S409.

In step S410, the CPU 101 adds only the RAW moving image selected in step S401 to the export queue. Then, the operation of FIG. 4 ends.

According to the first embodiment, re-export can be performed collectively for a selected RAW moving image and RAW moving images whose parameter used for export matches that of the selected RAW moving image as described above. Thus, it is possible to efficiently re-export a plurality of RAW moving images.

Second Embodiment

A second embodiment of the present invention will now be described. An example in which RAW moving images other than a specific RAW moving image designated by a user are detected and re-export is performed collectively for these RAW moving images has been described in the first embodiment. However, the timing at which the user desires to change parameters for export is not limited to after performing export. Before performing export, the user may also desire to change parameters that have been set. For example, after adding a RAW moving image to the export queue, the user may notice errors in parameters and issue an instruction to change the parameters before performing export. An example in which RAW moving images other than a specific RAW moving image designated by the user are detected and parameters are changed collectively for these RAW moving images before export is performed will be described in the second embodiment. In the following, different portions (components and processing) from the first embodiment will be described in detail and description of the same portions as the first embodiment will be omitted.

Figure 7:
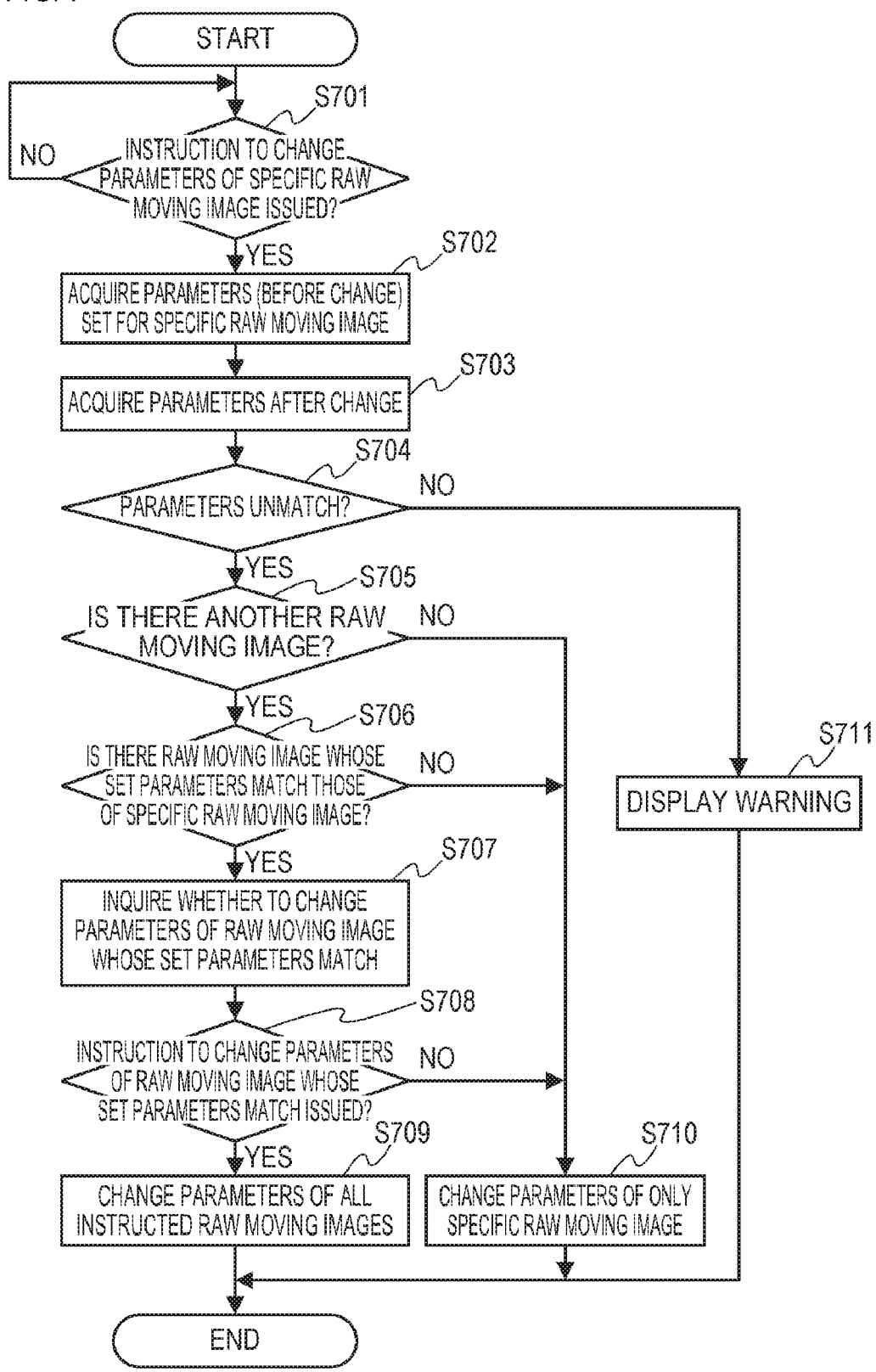
FIG. 7 is a flowchart showing an exemplary operation according to a second embodiment.

FIG. 7 is a flowchart showing an exemplary operation of the PC 100 (the export application) when changing set parameters before export is performed. The operation of FIG. 7 starts, for example, in accordance with display of the export queue window 300 of FIG. 3A.

In step S701, the CPU 101 determines whether or not the user has issued an instruction to change parameters that have been set for a specific RAW moving image. The CPU 101 repeats the processing of step S701 until a change instruction (user operation) is issued. When a change instruction has been issued, the CPU 101 selects a specific RAW moving image in accordance with the instruction and advances the processing to step S702.

Figure 8B:
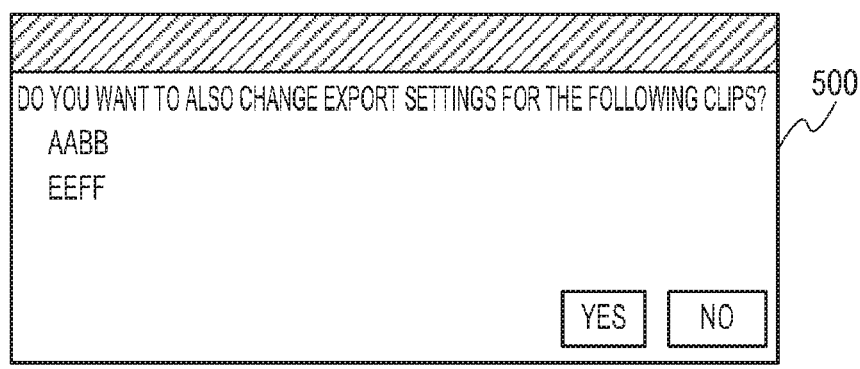

FIG. 8A shows an example of the export queue window 300. As shown in FIG. 8A, the CPU 101 displays a context menu 813 in accordance with a user operation of designating a specific RAW moving image from the export content display portion 301 (a list of RAW moving images in the export queue). The context menu 813 is a menu for inquiring of the user whether or not to change parameters that have been set for the specific RAW moving image (the RAW moving image designated by the user). The instruction to change parameters is a user operation for designating "change export settings" in the context menu 813. Here, it is assumed that an instruction to change parameters that have been set for a RAW moving image CCDD has been issued.

In step S702, the CPU 101 acquires parameters (parameters before change) that have been set for the RAW moving image which has been selected in step S701 (for which the parameter change instruction (user operation) has been issued). Specifically, the CPU 101 acquires parameters (a save folder, an output format, an output resolution, and development settings) displayed in association with the RAW moving image CCDD in the export content display portion 301 in FIG. 8A.

In step S703, the CPU 101 acquires parameters after change. Specifically, the CPU 101 acquires a plurality of parameters that have been designated through the development parameter setting portion 240 in FIG. 2A and the save folder setting portion 261, the export file format setting portion 262, and the output resolution setting portion 263 in FIG. 2B. That is, the CPU 101 acquires the brightness, color temperature, sharpness, color space, gamma, high-speed development setting, save folder, output format, and output resolution that have been designated.

In step S704, the CPU 101 compares the parameters acquired in step S702 with the parameters acquired in step S703 and determines whether or not they differ from each other. Specifically, the CPU 101 determines whether or not a type of which a parameter acquired in step S702 and a parameter acquired in step S703 differ from each other is included in a plurality of types of the plurality of parameters. If such a type is included, the processing proceeds to step S705. If such a type is not included (the plurality of parameters acquired in step S702 completely match the plurality of parameters acquired in step S703), the processing proceeds to step S711.

In step S711, the CPU 101 provides predetermined notification. Specifically, the CPU 101 displays a message (warning) on the display 110 to notify the user that the parameters are the same before and after change. Then, the CPU 101 ends the operation of FIG. 7 without performing the processing for changing parameters.

In step S705, the CPU 101 determines whether or not a RAW moving image other than the RAW moving image selected in step S701 is present in the export content display portion 301 (the list of RAW moving images for which parameters have been set) in FIG. 8A. The processing proceeds to step S706 if such a RAW moving image is present, and otherwise proceeds to step S710.

In step S706, the CPU 101 acquires parameters that have been set for all RAW moving images that have been determined to be present in step S705. Then, the CPU 101 determines whether or not there is a RAW moving image which has been determined to be present in step S705 and whose parameter that has been set matches a parameter acquired in step S702. The processing proceeds to step S707 if there is such a RAW moving image, and otherwise proceeds to step S710.

Note that the RAW moving image detected in step S706 may or may not be a RAW moving image of which a plurality of parameters that have been set all match those of the specific RAW moving image (the RAW moving image selected in step S701). The RAW moving image detected in step S706 may be a RAW moving image of which some of a plurality of parameters that have been set matches that of the specific RAW moving image. The RAW moving image detected in step S706 may be a RAW moving image of which only an output format that has been set matches that of the specific RAW moving image. The RAW moving image detected in step S706 may be a RAW moving image of which only a specific type(s) of parameter(s), which is some or all of a plurality of parameters that have been set, matches that of the specific RAW moving image. The specific type (the specific type of parameter) may be determined in advance or may be determined using various methods as described in the first embodiment.

In step S707, the CPU 101 inquires of the user whether or not to also change parameters that have been set for the RAW moving images detected in step S706 (the RAW moving images determined to be present). Specifically, the CPU 101 displays a dialog 800 for inquiring of the user whether or not to also change parameters that have been set for the RAW moving images detected in step S706 on the display 110 as shown in FIG. 813. A list of the RAW moving images detected in step S706 or the like is displayed in the dialog 800, In the example of FIG. 8B, a list of RAW moving images AABB and EEFF is displayed by the names of the images. Shooting settings, development settings, a thumbnail, and the like of each RAW moving image may be further displayed.

In step S708, the CPU 101 determines whether or not the user has issued a parameter change instruction (reply) in response to the inquiry of step S707. The processing proceeds to step S709 when an instruction has been issued (when a "YES" button has been pressed in the dialog 800 of FIG. 8B) and proceeds to step S710 when no instruction has been issued (when a "NO" button has been pressed in the dialog of FIG. 8B).

In step S709, the CPU 101 collectively changes the parameters that have been set for the RAW moving image selected in step S701 and the RAW moving images detected in step S706. Then, the operation of FIG. 7 ends. FIG. 8C shows an example of the export queue window 300 after the processing of step S709. In the example of FIG. 8C, the parameters set for the RAW moving images AABB, CCDD, and EEFF have been changed from those of FIG. 8A.

In step S710, the CPU 101 changes only the parameters that have been set for the RAW moving image selected in step S701. Then, the operation of FIG. 7 ends.

According to the second embodiment, it is possible to collectively change parameters that have been set for a selected RAW moving image and RAW moving images whose parameter that has been set matches that of the selected RAW moving image as described above. Thus, it is possible to efficiently change parameters for a plurality of RAW moving images.

Although preferred embodiments of the present invention have been described above, the present invention is not limited to these embodiments and various modifications and changes can be made within the scope of the invention.

According to the present disclosure, it is possible to efficiently perform re-export or parameter change of a plurality of RAW moving images.

<Other Embodiments>

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No 2019-078658, filed on Apr. 17, 2019, which is hereby incorporated by reference herein in its entirety.

What is claimed is:

1. An information processing apparatus comprising at least one memory and at least one processor which function as:
a setting unit configured to set a parameter for export processing of a RAW moving image;
an export unit configured to perform export processing to develop a RAW moving image and save the developed moving image in a predetermined storage area, using the parameter set by the setting unit;
a first selecting unit configured to select at least one of a plurality of RAW moving images on which export processing of the export unit is performed, in accordance with a user operation; and
a second selecting unit configured to automatically select, from a plurality of RAW moving images not selected by the first selecting unit, a RAW moving image whose a parameter used for export processing matches that of a RAW moving image selected by the first selecting unit, wherein
the export unit collectively performs re-export processing which uses a parameter different from the parameter used for the export processing, on the RAW moving image selected by the first selecting unit and the RAW moving image selected by the second selecting unit.

2. The information processing apparatus according to claim 1, wherein
the parameter is at least one of a development parameter, a save folder of a developed moving image, a file format of the developed moving image, and a resolution of the developed moving image, the development parameter including at least one of brightness, color temperature, sharpness, color space, gamma, and high-speed development enabling/disabling.

3. The information processing apparatus according to claim 1, wherein
the setting unit sets a plurality of parameters.

4. The information processing apparatus according to claim 1, wherein
the setting unit sets a plurality of parameters, and
the export unit collectively performs the re-export processing on the RAW moving image selected by the first selecting unit and a RAW moving image which is selected by the second selecting unit and of which some of a plurality of parameters used for export processing matches that of the RAW moving image selected by the first selecting unit.

5. The information processing apparatus according to claim 1, wherein
the setting unit sets a plurality of parameters, and
the export unit collectively performs the re-export processing on the RAW moving image selected by the first selecting unit and a RAW moving image which is selected by the second selecting unit and of which a specific type of parameter which is some or all of a plurality of parameters used for export processing, matches that of the RAW moving image selected by the first selecting unit.

6. The information processing apparatus according to claim 5, wherein
the specific type is a type designated by a user.

7. The information processing apparatus according to claim 5, wherein
the specific type of parameter in a case where a plurality of RAW moving images are selected by the first selecting unit is a parameter commonly used in export processing of the plurality of RAW moving images.

8. The information processing apparatus according to claim 1, wherein
the at least one memory and at least one processor further function as a display control unit configured to perform control such that a list of information relating to a plurality of RAW moving images on which export processing of the export unit is performed, is displayed on a screen.

9. The information processing apparatus according to claim 1, wherein
the at least one memory and at least one processor further function as a notification control unit configured to perform control such that a predetermined notification is performed before re-export processing is performed on the RAW moving image selected by the second selecting unit.

10. The information processing apparatus according to claim 9, wherein
the export unit selectively performs re-export processing on the RAW moving image selected by the second selecting unit in accordance with a user instruction in response to the predetermined notification.

11. An information processing method comprising:
a setting step of setting a parameter for export processing of a RAW moving image;
an export step of performing export processing to develop a RAW moving image and save the developed moving image in a predetermined storage area, using the parameter set in the setting step;
a first selecting step of selecting at least one of a plurality of RAW moving images on which export processing in the export step is performed, in accordance with a user operation; and
a second selecting step of automatically selecting, from a plurality of RAW moving images not selected in the first selecting step, a RAW moving image whose a parameter used for export processing matches that of a RAW moving image selected in the first selecting step, wherein
in the export step, re-export processing which uses a parameter different from the parameter used for the export processing is collectively performed on the RAW moving image selected in the first selecting step and the RAW moving image selected in the second selecting step.

12. A non-transitory computer readable medium that stores a program, wherein the program causes a computer to execute an information processing method comprising:
a setting step of setting a parameter for export processing of a RAW moving image;
an export step of performing export processing to develop a RAW moving image and save the developed moving image in a predetermined storage area, using the parameter set in the setting step;

a first selecting step of selecting at least one of a plurality of RAW moving images on which export processing in the export step is performed, in accordance with a user operation; and a second selecting step of automatically selecting, from a plurality of RAW moving images not selected in the first selecting step, a RAW moving image whose a parameter used for export processing matches that of a RAW moving image selected in the first selecting step, wherein in the export step, re-export processing which uses a parameter different from the parameter used for the export processing is collectively performed on the RAW moving image selected in the first selecting step and the RAW moving image selected in the second selecting step.

\* \* \* \* \*